United States Patent [19]
Feustel et al.

[11] Patent Number: 5,632,953
[45] Date of Patent: May 27, 1997

[54] PROCESS AND DEVICE FOR MELTING IRON METALLURGICAL MATERIALS IN A COKE-FIRED CUPOLA

[75] Inventors: Hans U. Feustel, An der Märchenwiese 72; Joachim Mallon, Krokerstrasse 3, both of Leipzig; Michael Schaaf, Ernst-Thälmann-Str. 5, Rückmarsdorf; Edmund Wilms, Ahrensbök; Gerhard Neumann, Freiberg; Karl-Heinz Köhler, Elsterberg; Ludwig Ruschitzka, Halsbrücke, all of Germany

[73] Assignees: Hans U. Feustel; Joachim Mallon, both of Leipzig; Michael Schaaf, Rückmarsdorf, all of Germany

[21] Appl. No.: 492,016

[22] PCT Filed: Jan. 18, 1994

[86] PCT No.: PCT/EP94/00108
§ 371 Date: Sep. 11, 1995
§ 102(e) Date: Sep. 11, 1995

[87] PCT Pub. No.: WO94/17352
PCT Pub. Date: Aug. 4, 1994

[30] Foreign Application Priority Data

Jan. 20, 1993 [DE] Germany .................. 43 01 322.8

[51] Int. Cl.⁶ .................................................. C21B 11/02
[52] U.S. Cl. .................. 266/156; 266/197; 266/44
[58] Field of Search .......................... 266/197, 154, 266/156, 193, 44

[56] References Cited

U.S. PATENT DOCUMENTS

| | | | |
|---|---|---|---|
| 1,815,899 | 7/1931 | Brassert | 266/156 |
| 2,283,163 | 5/1942 | Brassert et al. | 266/197 |
| 2,788,964 | 4/1957 | Schnyder | 266/156 |
| 3,216,711 | 11/1965 | Diotalevi et al. | 266/156 |
| 3,236,628 | 2/1966 | Bogandy | 266/156 |
| 4,324,583 | 4/1982 | Hamilton | 266/156 |
| 4,769,065 | 9/1988 | Dighe et al. | 266/197 |
| 4,828,607 | 5/1989 | Dighe et al. | 266/197 |

FOREIGN PATENT DOCUMENTS

| | | |
|---|---|---|
| 0056644 | 7/1982 | European Pat. Off. |
| 3437911 | 4/1986 | Germany |
| 299917 | 5/1992 | Germany |
| 914904 | 1/1963 | United Kingdom |

OTHER PUBLICATIONS

"Entwicklungen beim Schmelzen von Eisengusswerkstoffen . . ." Giesserei 79, Dec. 1992, Nr. 4, pp. 134–143.

"Developments of Cupola Melting" Dr. Rachner, The Foundryman 84, Mar. 1991, pp. 114–118.

*Primary Examiner*—Scott Kastler
*Attorney, Agent, or Firm*—Cohen, Pontani, Lieberman, Pavane

[57] ABSTRACT

A coke-fired cupola, including: a furnace shaft having a well at one end, a charging device connected to the shaft, a lower-mouth exhaust connected to the shaft below the charging device, and a furnace gas exhaust ring arranged at the shaft below the charging device and the lower-mouth exhaust. Additionally, at least one nozzle is connected to the shaft above the well. The at least one nozzle has a centrally run oxygen lance. A gas recirculating circuit is provided for connecting the furnace gas exhaust ring to the at least one nozzle. The gas recirculating circuit includes an exhaust device connected to the furnace gas exhaust ring, a recirculating gas ring connected to the at least one nozzle and a recirculating gas duct connected between the exhaust device and the recirculating gas ring.

13 Claims, 3 Drawing Sheets

PROCESS AND DEVICE FOR MELTING IRON METALLURGICAL MATERIALS IN A COKE-FIRED CUPOLA

FIELD OF THE INVENTION

The invention relates to a coke-fired cupola having a recirculating gas circuit and to a process for melting iron metallurgical materials, especially low-carbon oxidation-susceptible iron metallurgical charge materials, such as steel scrap, for example, for the production of cast iron.

DESCRIPTION OF THE PRIOR ART

A known distinction is generally made among classic cupolas on the basis of process-related and technological factors, identifying them as those operated with air (DD 299917 A7 and DE 3437911 C2), with oxygen enrichment, and with direct oxygen injection (U.S. Pat. No. 4,324,583). The direct injection of a secondary gas containing oxygen (50% to 100% oxygen) at supersonic speed, the gas being directly injected by nozzles separately from the primary air blast containing oxygen, which is disclosed, for example, in U.S. Pat. No. 4,324,583, leads to improved coke combustion and Si pick-up as well as to higher C contents and lower heat losses via the cupola mantle. In keeping with the Jungbluth diagram, only the supply of an optimal quantity of air is advantageous in coke-fired cupolas or blast melting furnaces, from the point of view of heat engineering, in terms of technical process. This means that enriching the air blast with oxygen is useful only for those furnace areas that do not achieve optimal heat conditions. Enrichment of the air blast with oxygen leads, as is known, to an increase in melting rate. In the case of an oxygen supply of up to 100%, a five fold increase in melting rate must be expected. At the same time, the combustion ratio is lowered, i.e., the CO share of the reaction gas in the furnace increases, the heat conditions deteriorate and can lead to the point of melting interruption. Enriching the air blast with oxygen while maintaining melting rate limits of practical value therefore necessitates a reduction in the air blast quantities; i.e., in the case of a cupola operated with a hot blast, a reduction in the hot blast quantity, and thus a reduction in the quantity of furnace gas, is required. The reduction in furnace gas quantity leads to a reduction in gas speeds in the furnace, as a result of which the share of the heat transfer as a function of the gas quantity in the fill drops and melting-off is hampered. Furthermore, high oxygen concentrations are created by the injection of oxygen in the fill area, which, due to the coarseness of the pieces of coke, cannot be completely converted with carbon when the concentration limit ranges are exceeded. The unconverted oxygen reacts with iron to form FeO and leads to limitations in the melting process.

That hot-blast cupola, the hot blast of which is generated in the recuperator and acted upon by flue gas created during top gas consumption, is currently the most widespread hot-blast cupola design. This furnace is also suitable for the manufacture of cast iron using high shares of steel scrap. It is also known that in hot-blast cupolas, via the temperature-dependent Boudouard equilibrium $CO_2 + C \rightarrow CO$ furnace areas arise thermodynamically which act on the charge materials in both an oxidating and a reducing manner. The overheating of the molten iron thereby depends primarily on the level of the coke bed, i.e., on the drops-through time of the melted iron and on the temperature profile realized in the coke bed. In order to achieve the greatest possible overheating of the cast iron melt, the maximum gas temperatures are striven for in the oxidation zone during the coke conversion. This is realized in practice by preheating the combustion air up to 600° C. or by introducing additional oxygen.

In this way, gas temperatures from 2000° to 2200° C. are achieved. Higher temperatures are not attainable, due to the increasing tendency of the combustion products to disassociate and the high flow speeds in the overheating zone. During melting of low-carbon metal scrap, the hot-blast cupola has the disadvantage, in terms of technical process, that a strongly oxidizing furnace atmosphere is created in the nozzle area, which causes a silicon metal loss of up to 30%.

The cause of this is the heterogeneous combustion reaction of the coke. It is also disadvantageous that large specific top gas quantities arise during melting, which require high plant expenditure for the gas economy. A special design of the coke-fired cupola is known from (U.S. Pat. No. 2,788,964). This cupola is a hot-blast furnace for producing pig iron through the reduction of iron ores; however, it is also supposed to be usable as a remelting furnace for pig iron and iron/steel scrap. It is characteristic that the hot blast is blasted at up to 1000° C. through a ring-shaped line and is brought from there via lines into the reduction zone of the shaft in the downward direction through nozzles. Due to the combustion, a mixture of ore and anthracite drizzles through the reduction zone, which is filled with coarse coke. In the reduction zone, the ore is reduced, and temperatures of up to 1900° C. are reached. The gas outlet in the hearth area directly above the melting bath permits the out-take of a main stream of exhaust gases, which are fed to a special construction of a hot-blast generator and thus heat the fresh blast air. The temperature of the exhaust gases is to be above 1600° C. A reduction of the CO content of the reduction gas is to be achieved in the reduction zone of the furnace by virtue of the fact that the hot blast, which is an oxygen carrier, burns carbon monoxide to form carbon dioxide. The blast furnace is furthermore provided with a line and a ventilator, through which, as an auxiliary flow, an upwardly directed gas stream rich in hydrocarbons (i.e., carbon monoxide poor) is exhausted from an exhaust duct in the upper shaft region and fed back into the combustion and reduction zone via a ring line through nozzles below the nozzles for supplying the hot blast. The forced flow of the major part of the furnace gases, i.e., the so-called downwardly directed combustion, which is also known as reverse firing, should permit temperatures of 1800° C. to 1900° C. to be produced in the reduction zone, thus making possible the reduction of iron ore. The disadvantage of this hot-blast furnace is that the exothermic processes which are decisive for coke-fired and/or coal-fired blast melting furnaces are arranged downward from the hot-blast nozzles, and only there do the hot reaction gases necessary for the heat transfer to the fixed charge arise. Thus when the alternating-current principle, effective and proved for heat transfer, is changed to the ineffective direct-current principle for the heat transfer, only a shortened shaft portion is available, corresponding to a reduction to ¼ of the normal heat transfer zone, which is not compensated for through other measures in (U.S. Pat. No. 2,788,964.) Because the attained furnace room temperatures from 1800° C. to 1900° C. correspond to the usual level of cold-blast or hot-blast furnaces, melting an iron metallurgical charge is not reliably possible under these conditions.

The upwardly directed auxiliary flow created above the hot-blast nozzles consists of hydrocarbons, mainly methane formed via the water gas reaction and the methane reaction. The conditions for forming methane according to this mechanism, however, call for temperatures greater than 700° C. at normal pressure and, under technical conditions, for temperatures preferably of 1000° C. and an atmosphere saturated with water vapor. However, the furnace according to U.S. Pat. No. 2,788,964 rules out precisely these conditions, so that an upwardly directed flow of gaseous hydrocarbon cannot be created and the circulatory principle thus cannot be implemented.

In terms of heat engineering, feeding hydrocarbons to a level below the hot-blast nozzles is meaningless, because this level is too far removed from the blast nozzles. As a result, the air-oxygen of the hot blast has already converted with the carbon of the coke bed and/or coal bed and is no longer available for the methane combustion. Methane is thus taken out at the exhaust opening located directly below without being used. If portions of the C—H compounds nonetheless combust to $CO_2$ and $H_2O$, these gas components, together with the $CO_2$ arising from the combustion of the coke and/or the coal, are endothermically reduced, below the nozzles to CO and $H_2$ by the carbon of the coke and/or the coal, in keeping with the effect of the Boudouard equilibrium, as a result of which a lowering of the temperature in the reduction zone and a consumption of the coarse coke occur as effects.

Furthermore, it is also disadvantageous in the case of the furnace according to U.S. Pat. No. 2,788,964 that, due to the unheated shaft above the hot-blast nozzles, the exothermic indirect reduction that is particularly important to the blast-furnace process and dominates with 55% to 60% of the total reduction, which rests on the formation of expanded temperature zones between 800° C. and 1000° C., is suppressed. Above 1000° C., direct endothermic reduction begins. The burden placed in the furnace is first heated suddenly to temperatures greater than 1000° C. on the nozzle level and then immediately subjected to the conditions for direct reduction. The substantially higher demand for heat connected with this can no longer be met by the standard described burden, as a result of which the heat budget of the furnace collapses and the process may come to a standstill.

Also disadvantageous is the geometric design of the furnace zone below the throat, which in the short, compacted design shown cannot make available the necessary time reserves for the heating and diffusion processes. It is also disadvantageous that the coarse-granular coke bed is consumed before the air nozzles and is replaced only by small-piece burden and coke and/or coal. In this way, the gas distribution, heating up and diffusion necessary to the process are additionally hampered in a granulometric fashion. The blast-furnace process according to the process in (U.S. Pat. No. 2,788,964) is, like the use of the depicted recirculating gas process and the melting of the metal charge, not possible for reasons of heat engineering, geometry and flow engineering.

All currently known new developments also have disadvantages during the melting of low-carbon, oxidation-susceptible iron metallurgical materials. In the furnace developed by the TUPI Company in Brazil, the iron metallurgical charge materials are charged in a central shaft. The coke and lime are fed to a well via six filling shafts arranged symmetrically around the perimeter. The combustion air, which is blasted in at high speed through special nozzles, is not preheated. The combustion air is enriched, however, with up to 1.5% oxygen. The furnace is controlled in such a way that the combustion gases always flow through the central shaft and in this way heat the iron metallurgical charge materials thoroughly. Through a secondary row of nozzles, the gases containing CO are post-combusted prior to entry into the central shaft. The disadvantages of the furnace are that a large number of channels form through the bed, through which gas flows and which cannot be supplied with hot combustion air in an even manner. As a result, no complete mixing of combustion air and combustion gas occurs and thus no complete conversion of the CO into $CO_2$ takes place. The exhaust gas still has a CO content of >0.1% by volume. In order to avoid environmental pollution, relatively high expenditures for the gas economy are accordingly also required here. In hot-blast cupolas having plasma burners, the combustion air is traditionally additionally preheated, due to the high CO shares and the required post-combustion. The plasma burner is subsequently used for heating a partial flow of the combustion air to temperatures of 3000° to 5000° C., whereby any desired mixing temperature can be set. The initial temperature of the combustion air may be up to 1400° C. These high temperatures require a reducing furnace practice. The disadvantages of the hot-blast cupolas having plasma burners are found in the relatively high electricity costs, because here melting is carried out indirectly in electrical fashion. The $CO_2$ output also is large.

In order to avoid the large gas output, conceptual models of this type of furnace have been developed as an idea for the future (Sonderdruck GieBerei 79 (1992) 4, pp. 134–143). A closed gas circuit is to be formed, in that a highly heated gas is produced as a heat carrier, e.g., via a plasma burner, in partial flux, and is then brought to the desired temperature by being mixed with the remaining gas. The top gas is exhausted completely and, after being purified, is fed again to the plasma burner for heating. It is disadvantageous that in order to realize this conceptual model, high equipment expenditures, in conjunction with large space requirements, are needed; furthermore, the melting process, conditioned on the production of an artificial furnace gas composition, can be reliably carried out only through additional measurement and control technology.

The object of the invention is to develop a simply functioning coke-fired cupola having a recirculating gas circuit and a process characterized by low melting costs and the avoidance of silicon metal loss for reliably melting iron metallurgical materials, especially low-carbon, oxidation-susceptible iron metallurgical charge materials, such as steel scrap, for the production of cast iron, which allows a low and CO-free top gas quantity to develop and thus sharply reduces environmental pollution. According to the inventive process, the above mentioned object is attained in that furnace gas having a temperature >400° C. is partially drawn off in the preheating zone and is fed back into the melting and overheating zone together with >23%, preferably 33% to 48% oxygen, relative to the supplied gas quantity. A further feature of the inventive process is that the partially withdrawn furnace gas quantity equals up to 70% of the furnace gases arising during the melting process. Advantageously, the exhaust gas volume is reduced, because the ballast gas nitrogen of the blast present in blast-operated cupolas is replaced by the energetically useful furnace gas (as circulating gas) and is usefully utilized in the melting process. The furnace gas here acts as a gaseous fuel and combusts with the supplied oxygen thus, intensifying the reducing conditions in the furnace. The device-related expense for the gas economy is low.

The coke-fired cupola according to the invention, is used exclusively with oxygen as the combustion medium and conveyor medium for the CO-rich furnace gas that is drawn off below the throat and is not subsequently combusted. In this way, the subsequent combustion to CO-free exhaust gas, which is the prerequisite for producing a hot blast from fresh air (c. 21% $O_2$, 79% $N_2$) via heat exchange from the hot furnace gas and in classic cupolas is carried out outside of the bedding, is moved in the cupola, according to the invention, into the bedding directly before the oxidation zone. The described and practically-confirmed effects of the furnace are thus based on the fact that the furnace is operated in principle without the nitrogen carrier air, i.e., exclusively with oxygen as the combustion means. Advantageously, the use of the energy contents of the furnace gases containing CO occurs directly, without going through the hot-blast production in the melting and overheating zone. Only in this way can the process-typical displacement of the Boudouard equilibrium toward CO be achieved.

The design according to the invention of the nozzle area in the furnace mantle permits the furnace gas to be mixed with oxygen and a conversion of $CO+O_2$ to $CO_2$ to begin already at the nozzle mouth. This leads to the desired furnace atmosphere and metallurgical effects. The invention is described in greater detail below in reference to the example of melting two grey cast iron alloys.

DETAILED DESCRIPTION OF THE PREFERRED EMBODIMENTS

Figure 1:
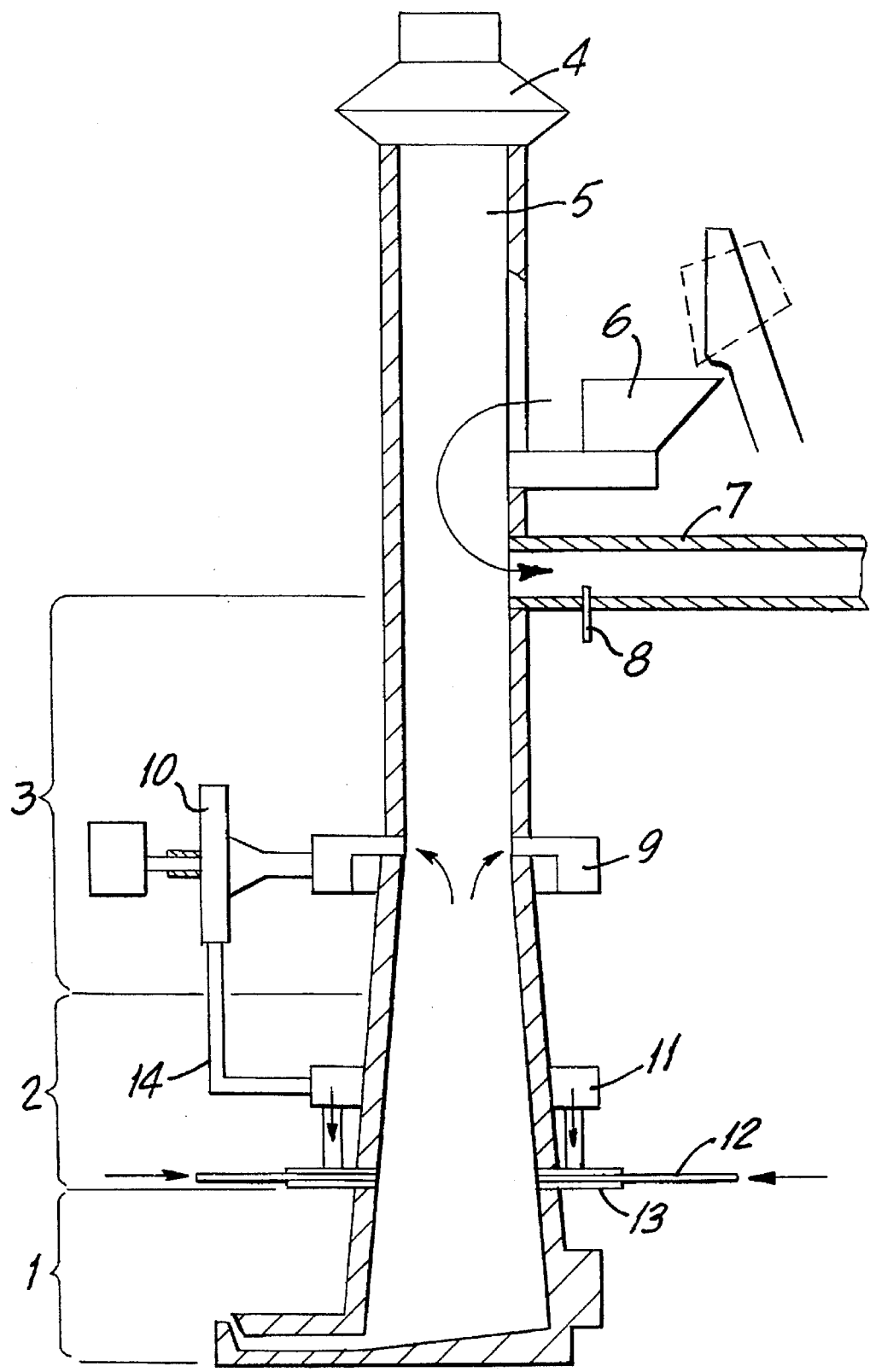
FIG. 1 is a cross-section of a cupola according to the invention.

FIG. 1 shows a coke-fired cupola having an exhaust smoke stack 4, in section. It shows that below the charging device 6 and the lower mouth exhaust 7 in the area of the preheating zone 3, there is a furnace gas exhaust ring 9, and above a well 1 in an area of the melting and overheating zone 2 there are four nozzles 13, which have centrally-run oxygen lances 12, whereby the furnace gas exchange ring 9 is connected to the nozzles 13 by a radial ventilator 10, a recirculating gas duct 14 and a recirculating gas ring 11.

Figure 2:
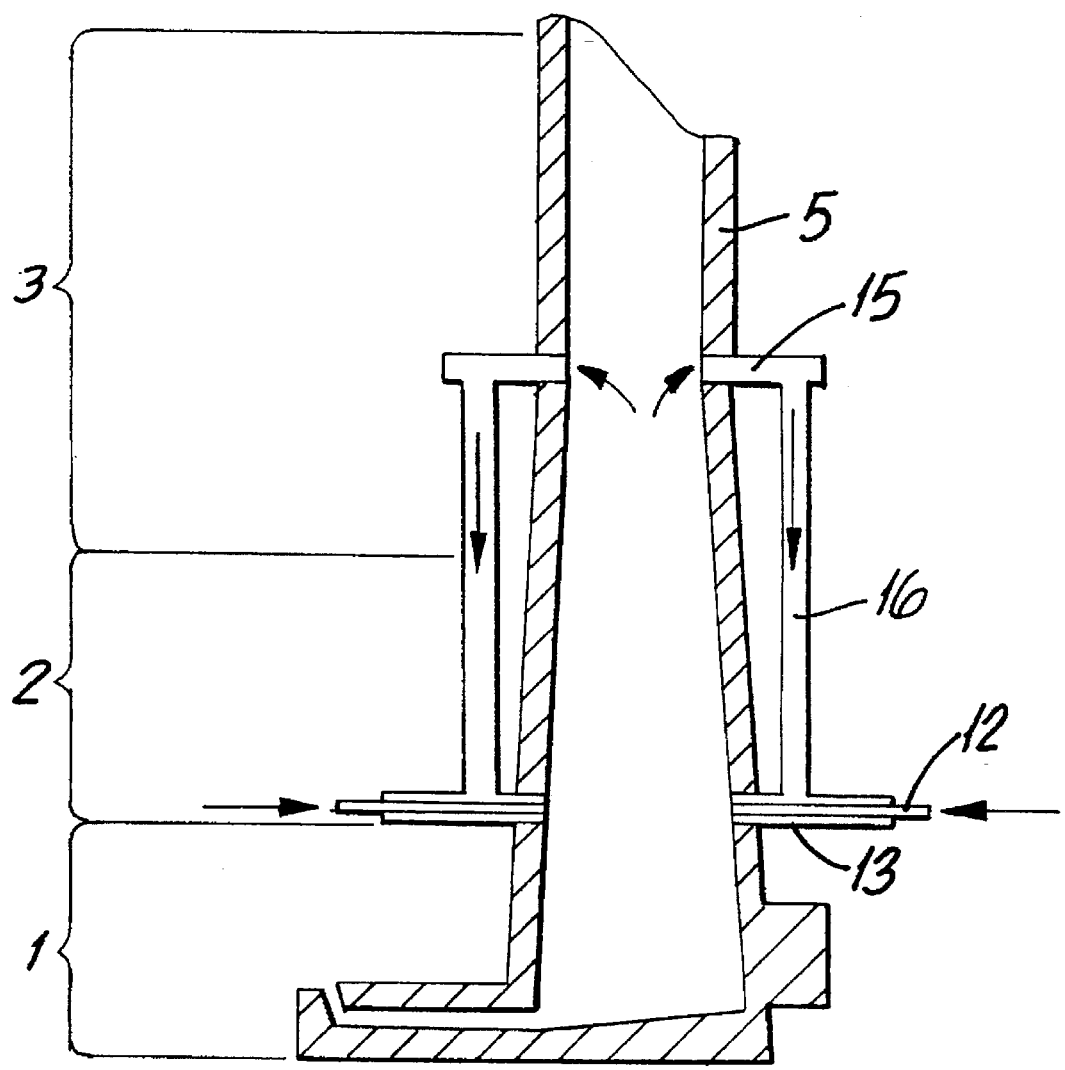
FIG. 2 A further embodiment of the coke-fired cupola, in section.

FIG. 2 shows a further embodiment of the coke-fired cupola, in section. It is characteristic here that below the charging device 6 and the lower mouth exhaust 7, there are four furnace gas exhaust openings 15 arranged around the perimeter of the furnace shaft 5. The opening 15 are connected by ducts 16 to the nozzles 13 above the well 1, nozzles 13 which also have the centrally-run oxygen lances 12.

Figure 3:
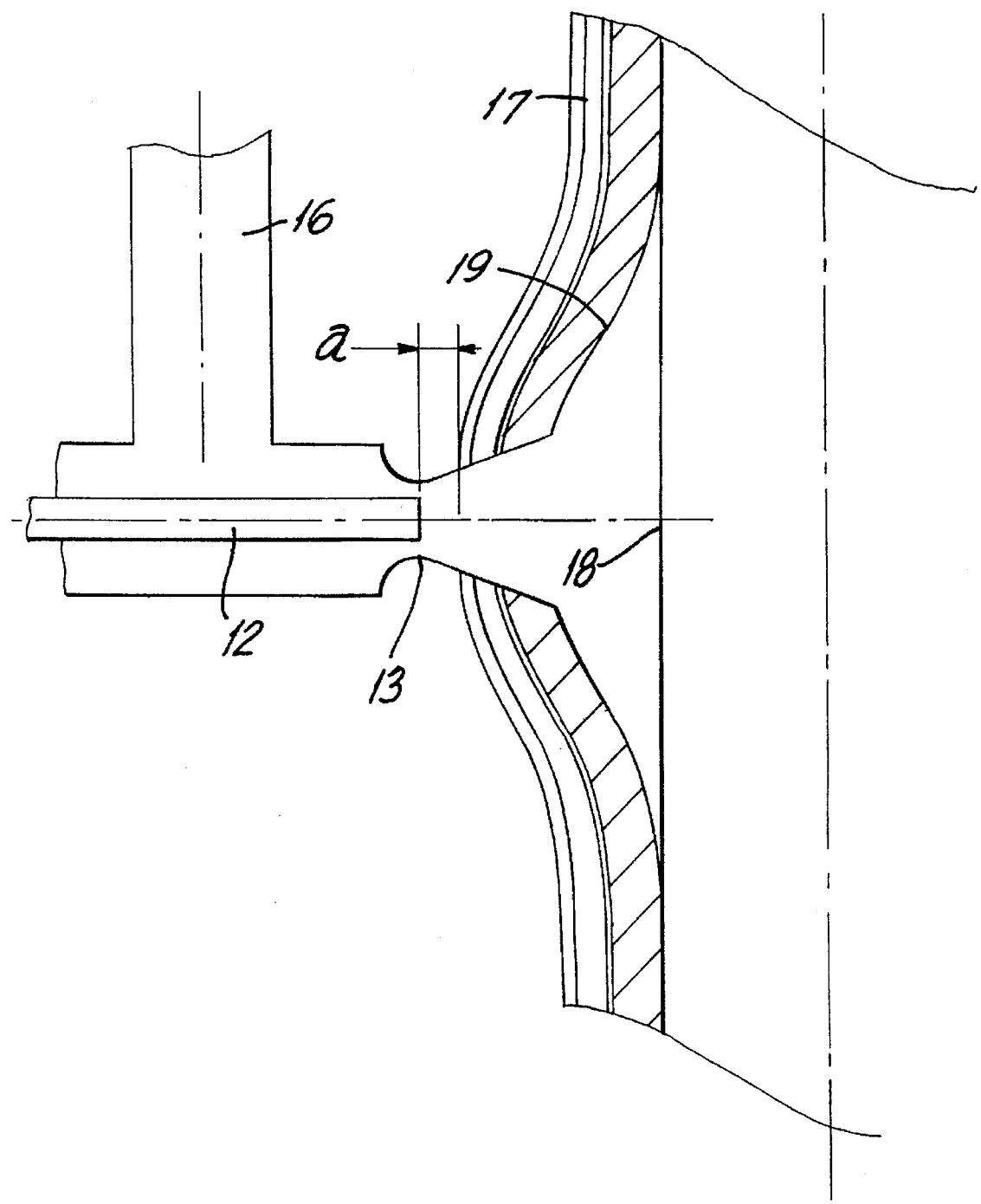
FIG. 3 Illustrates the design according to the invention of the nozzle area in the furnace mantle, in section.

FIG. 3 shows the design according to the invention of the nozzle area in the furnace mantle, in section. The furnace mantle 17 has, in the area of the nozzle acting in direction 18, a calotte-type widening 19, and the oxygen lances 12 which run centrally in the nozzle 13 have a distance a of 18 mm to the furnace mantle 17. The distance a is variable but must be at least 15 mm. An arrangement of this type of nozzle and oxygen lance acts as a suctioning injector, like, for example, a gas jet compressor. For the melting according to the invention of grey cast iron alloys, the process is as described below.

EXAMPLE 1

Via the charging device 6, the coke-fired cupola is charged with iron metallurgical charging material consisting of 50% scrap castings and 50% returns with charge coke and slag-forming constituent. Charge coke is that portion of fuel which is fed to the cupola as a replacement for the share of the fuel bed coke during the melting and overheating process. Bed coke is that portion of the fuel which, prior to the beginning of melting and overheating, is brought into the cupola for building up a coke bed. This coke bed forms the melting and overheating zone as well as the area of carbon pick-up for the melted iron metallurgical charge material. Slag-forming constituents are mineral components that are needed to slag the coke ashes which are created when the coke is burned. The quantity in which slag-forming constituent is added is specified in percent to the added charge coke quantity in kg/charge. The charge coke quantity is specified in percent to the weight of the iron metallurgical charge material. The bed coke is specified in percent to the weight of the iron metallurgical charge during one melting series, i.e., taking into consideration the number of the melted iron metallurgical charge material quantity over the entire melting time. The charge make up analysis results in 3.42% C, 1.85% Si, 0.62% Mn, 0.50% P, 0.11% S and >1% trace elements as well as up to 100% Fe. The iron oxide share of the charge material is 2%. Per charge, 10.43% charge coke, lump size 60/90 is added. The proportional share of bed coke, lump size 80/100, is 1.81%, and 20% limestone of the charge coke is used as a slag-forming constituent. Through the radial ventilator 10, 60% of the furnace gas, which is composed of approximately 63% CO and 37% $CO_2$ as well as of residual gas ($H_2$ and $H_2O$), is fed back to the furnace from the furnace gas exhaust ring 9 of the nozzles 13. This furnace gas has a temperature of 550° C. and burns through the simultaneous supply of 33% oxygen, relative to the supplied gas quantity. The resulting metallurgical processes with a reducing effect in the melting and overheating shaft lead to a molten iron analysis of 3.64% C, 2.03% Si, 0.58% Mn, 0.5% P and >0.11% S. The carbon pick-up rate of this make-up which is free of steel scrap, thus leads to 7% relatively, the silicon pick-up to 10% relatively, and the manganese metal loss to approximately 5% relatively. For carbon pick-up, 0.27% of the charge coke is needed, and for reducing the two-percent iron oxide share, 0.23% of the charge coke is need. The effective charge (melting) coke share is 11.75%. As a result of the alkaline furnace operation, a successive sulphurization of the cast iron is avoided. The invention causes a minimum of dust output, at the level of roughly 40% of the usual dust emissions from coke-fired cupolas. The remaining furnace gases are extracted by the lower-throat exhaust 7, whereby the ignition device 8 ensures a constant ignition of the top gas and thus complete subsequent combustion. Accordingly, the dust-removing devices installed downstream are smaller.

EXAMPLE 2

Via the charging device 6, the coke-fired cupola is charged with 25% cast chips, 40% steel scrap, including 30% shredder scrap, 32% returns, 0.22% FeSi formed bodies and 0.22% FeMn formed bodies. The make-up analysis reveals 2.09% C, 1.18% Si, 0.55% Mn, 0.34% P and 0.08% s and <1% trace elements as well as up to 100% Fe. The iron oxide supplement of the charge material is 2%. Per charge, 10.43% charge coke, lump size 60/90 is added. The proportional share of bed coke, lump size 80/100, is 1.81%. 20% limestone of the charge coke share is used as a slag-forming constituent. Through the furnace gas exhaust device 9, 60% of the furnace gas at a temperature of 480° C. is fed back through the nozzles 13 to the melting and overheating zone 2, whereby this burns through the simultaneous supply of 33% oxygen, relative to the supplied gas quantity. This yields a molten iron analysis of 3.55% C, 1.4% Si, 0.6% Mn, 0.40% P and >0.10% S. The carbon pick-up rate of this make-up, which consists only of hard-melting recycled materials leads to 71% relatively. The relative Si pick-up is approximately 10% and the relative manganese metal loss is approximately 5%. The sulphur pick-up results at 33% from the sulphur of the coke using an acidic furnace operation. For carbon pick-up, 1.67% of the charge coke is needed, and for reducing the iron oxide share, 0.23% of the charge coke is consumed. The effective charge (melting) coke share is 10.34%. The cupola tapping temperature is 1500° C. By drawing off of 60% furnace gas below the mouth from the packed bed and a combustion with oxygen in the well area the furnace, the dust output is minimized to approximately 40% of the dust emission usually existing during the cupula melting process. The remaining furnace gases which are not drawn off are subsequently completely combusted.

We claim:

1. A coke-fired cupola, comprising:

a furnace shaft having a well at one end;

a charging device connected to the shaft;

a lower-mouth exhaust connected to the shaft below the charging device;

a furnace gas exhaust ring arranged at the shaft below the charging device and the lower-mouth exhaust;

at least one nozzle connected to the shaft below the furnace gas exhaust ring and above the well, the at least one nozzle having a centrally run oxygen lance; and gas recirculating means for connecting the furnace gas exhaust ring to the at least one nozzle, the gas recirculating means including an exhaust device connected to the furnace gas exhaust ring, a recirculating gas ring connected to the at least one nozzle and a recirculating gas duct connected between the exhaust device and the recirculating gas ring.

2. A coke-fired cupola as defined in claim 1, wherein the exhaust device is a fan.

3. A coke-fired cupola as defined in claim 2, wherein the exhaust device is a radial ventilator.

4. A coke-fired cupola as defined in claim 1, wherein the furnace shaft has a plurality of furnace gas exhaust openings arranged around its perimeter below the charging device and the lower-mouth exhaust, and further comprising ducts which are arranged to connect the furnace gas exhaust openings to the at least one nozzle.

5. A coke-fired cupola as defined in claim 1, wherein the furnace shaft has a furnace mantle with a calotte-shaped widening in a region of the at least one nozzle.

6. A coke-fired cupola as defined in claim 5, wherein the oxygen lance is arranged in the at least one nozzle so that a tip of the lance is maintained at a distance from the furnace mantle.

7. A coke-fired cupola as defined in claim 6, wherein the oxygen lance is arranged at least 15 mm from the furnace mantle.

8. A coke-fired cupola as defined in claim 4, wherein the exhaust device is a sunctioning injector.

9. A coke-fired cupola as defined in claim 8, wherein the exhaust device is a gas jet compressor.

10. A coke-fired cupola as defined in claim 5, wherein the exhaust device is a sunctioning injector.

11. A coke-fired cupola as defined in claim 10, wherein the exhaust device is a gas jet compressor.

12. A process for melting iron metallurgical material in a coke-fired cupola having a gas recirculating circuit, comprising the steps of melting the metallurgical material in a well of the cupola; partially extracting up to 70% of furnace gas created during the melting and having a temperature of greater than 400° C. from a preheating zone of the cupola; and feeding back the partially extracted furnace gas into an oxygen free melting and overheating zone of the cupola together with greater than 23 % oxygen, relative to a supplied quantity of gas.

13. A process for melting as defined in claim 12, wherein the feeding back step includes feeding back the gas together with 33 to 48% oxygen relative to the supplied quantity of gas.

* * * * *